United States Patent
Marubashi et al.

(10) Patent No.: US 6,263,698 B1
(45) Date of Patent: Jul. 24, 2001

(54) DRIPPING DEVICE FOR AN ABSORPTION TYPE REFRIGERATOR

(75) Inventors: Tsutomu Marubashi, Nagoya; Kaoru Kawamoto, Osaka; Kaoru Watanabe, Isehara, all of (JP)

(73) Assignees: Rinnai Kabushiki Kaisha, Nagoya; Osaka Gas Co., Ltd., Osaka; NHK Spring Co., Ltd., Yokohama, all of (JP)

(*) Notice: Subject to any disclaimer, the term of this patent is extended or adjusted under 35 U.S.C. 154(b) by 0 days.

(21) Appl. No.: 09/297,337
(22) PCT Filed: Oct. 29, 1997
(86) PCT No.: PCT/JP97/03936
  § 371 Date: Jul. 2, 1999
  § 102(e) Date: Jul. 2, 1999
(87) PCT Pub. No.: WO98/19116
  PCT Pub. Date: May 7, 1998

(30) Foreign Application Priority Data
Oct. 30, 1996 (JP) .................................................. 8-288534

(51) Int. Cl.$^7$ .................................................. F25B 15/12
(52) U.S. Cl. ............................. 62/484; 62/485; 62/494
(58) Field of Search ............................. 62/484, 485, 494

(56) References Cited

U.S. PATENT DOCUMENTS

| | | | |
|---|---|---|---|
| 2,873,140 | 2/1959 | Merrick | 299/25 |
| 2,909,041 | * 10/1959 | Kleen et al. | 62/484 |
| 3,038,316 | * 6/1962 | Bourne | 62/484 |
| 4,127,009 | * 11/1978 | Phillips | 62/101 |
| 4,477,396 | * 10/1984 | Wilkinson | 261/140 |
| 4,823,864 | * 4/1989 | Rockenfeller | 165/104.12 |
| 5,367,884 | * 11/1994 | Phillips et al. | 62/101 |
| 5,463,880 | * 11/1995 | Nishino et al. | 62/484 |
| 5,622,060 | * 4/1997 | Kang | 62/485 |

* cited by examiner

Primary Examiner—William Doerrler
Assistant Examiner—Mark Shulman
(74) Attorney, Agent, or Firm—Morgan, Lewis & Bockius LLP

(57) ABSTRACT

A liquid outlet pipe extended from a lower end of a liquid storage reservoir 420 is communicated with a section in the proximity of a lower portion of a refrigerant liquid dispersing pipe 421. A plurality of liquid outlet holes 426 are provided on an upper surface of the refrigerant liquid dispersing pipe 421. Diameters of the liquid outlet holes 426 are differently determined depending on a distance between a communicated section of the liquid dispersing pipe 421 and the liquid storage reservoir 420, in order to equalize an amount of refrigerant liquid flowing from the outlet holes 126. When the liquid storage reservoir 420 is filled with the refrigerant liquid, the refrigerant liquid flows upward within the liquid dispersing pipe 421 so as to inject the refrigerant liquid in accordance with a liquid head pressure. This equalizes the amount of the refrigerant liquid injecting from each of the liquid outlet holes 426, and flowing along an entire area of an evaporation coil 41 evenly so as to significantly ameliorate an evaporation capability.

13 Claims, 12 Drawing Sheets

DRIPPING DEVICE FOR AN ABSORPTION TYPE REFRIGERATOR

FIELD OF THE INVENTION

The present invention relates to an absorption type refrigerator in which an absorption cycle is formed with lithium bromide or the like as an absorption liquid medium, and particularly concerns to a dripping device improved so as to evenly drip the absorption liquid or refrigerant liquid over an absorption device or evaporator.

DESCRIPTION OF PRIOR ART BEHIND THE INVENTION

In an absorption type refrigerator, a regenerator is provided to boil a low concentration absorption liquid so as to separate a high concentration absorption liquid from a refrigerant vapor which is then condensed to form a refrigerant liquid. The high concentration absorption liquid is sprayed over an outer surface of an absorption pipe (absorption coil) of an absorption device. When the refrigerant liquid is sprayed over an evaporation pipe (evaporation coil) of an evaporator, the refrigerant liquid evaporates to cool the chilled water running through the evaporation pipe. Then, a pump is driven to feed the chilled water to a heat exchanger so as to provide a cooling medium source. The cooling water which gains the heat at the heat exchanger is cooled again at the evaporation pipe.

Meanwhile, the high concentration absorption liquid absorbs the refrigerant vapor to produce heat on the outer surface of the absorption pipe. The heat thus produced is released from a cooling tower through the cooling water which is fed to the cooling tower by means of the pump.

The absorption liquid which absorbed the refrigerant liquid to change into the low concentration absorption liquid in the absorption device, is pumped back to the regenerator so as to form an absorption cycle.

In a dripping device in which the absorption liquid or the refrigerant liquid is dripped to the absorption pipe or the evaporation pipe, there is provided a trough-shaped reservoir to circularly disperse the condensed refrigerant liquid or the high concentration absorption liquid toward the respective pipes to be dripped. A plurality of syphon pipes are further prepared by a sheet metal processing or tubing so as to pluralistically distribute the liquid in the trough-shaped reservoir, and drip the respective liquids downwardly due to the action of syphon.

The syphon pipes are firmly fixed to the trough-shaped reservoir by means of, for example, welding or press-fit procedure, and activated by adjusting wetting degree and surface tension so that the dripping action may not be influenced by fluctuations of the liquid level stored by the trough-shaped reservoir.

With the above structure, the liquid in the trough-shaped reservoir is dripped by the action of syphon. The action of syphon is greatly influenced by a configuration and surface property (oxidized degree) of the syphon pipe and variations induced when assembling the syphon pipe to the trough-shaped reservoir, thus inviting variations in an amount of the dripped liquid due to varied dripping performance. This blocks the dripping liquid from evenly dispersing over the respective pipes so as to induce variations on an absorption and evaporation capability, thus hindering a way to ensure a uniform performance on all absorption type refrigerators produced in the manufacturing processes.

In order to obviate the above drawbacks, it has been considered to previously heat the syphon pipe to change its oxidized degree to adjust the wetting property so as to equalize the amount of the dripping liquid when assembling the syphon pipe to the trough-shaped reservoir. This, however, reduces the productivity with the added adjusting procedures during the assembling process.

In addition, the trough-shaped reservoir is in an upper open ended structure so that its tilting degree significantly affects on the amount of the dripping liquid. In order not to change the liquid level in the trough-shaped reservoir in which the syphon pipes are each secured to the trough-shaped reservoir, it is necessary to install the trough-shaped reservoir strictly in parallel with the horizontal direction. This requires a demanding precision when adjusting horizontality, thus deteriorating the workability when installing the syphon pipes to the trough-shaped reservoir.

Therefore, the present invention has made with the above drawbacks in mind, it is a main object of the invention to provide a dripping device for an absorption type refrigerator which is capable of precisely dripping the liquid with a relatively simple structure while ensuring a stable refrigerating capability without inviting any substantial variations on an amount of the dripping liquid.

DISCLOSURE OF THE INVENTION

According to the present invention, there is provided a dripping device for an absorption type refrigerator comprising: a regenerator means provided to separate a refrigerant vapor from an absorption liquid including a refrigerant by heating the absorption liquid; a condenser provided to cool the refrigerant vapor so as to condense the refrigerant vapor which is separated from the regenerator means; an evaporator provided to evaporate a condensed refrigerant liquid under a lower pressure; an absorption means provided so that the refrigerant vapor evaporated by the evaporator is absorbed by the absorption liquid supplied by the regenerator means; a pumping means provided to return the absorption liquid from the absorption means to the regenerator means so as to form an absorption cycle with the regenerator, the condenser, the evaporator and the absorption means; a dripping device provided to drip the refrigerant liquid toward an evaporation pipe in the evaporator, or dripping the absorption liquid toward an absorption pipe in the absorption means; a liquid storage means provided to store the liquid to be dripped; a close-ended pipe positioned under the liquid storage means and placed above the evaporation pipe or the absorption pipe, so as to communicate with a lower end of the liquid storage means; and a liquid dispersing pipe having a plurality of holes located along the close-ended pipe so as to inject the liquid therethrough supplied from the liquid storage means.

With the absorption cycle thus provided, the refrigerant vapor separated from the absorption liquid is condensed to form the refrigerant liquid while the absorption liquid is heated to be concentrated at the regenerator.

The dripping device provided herein drips the refrigerant liquid toward an evaporation pipe in the evaporator, or dripping the absorption liquid toward an absorption pipe in the absorption means.

The refrigerant liquid and the absorption liquid each stored in the liquid storage means is supplied to the liquid dispersing pipe (close-ended pipe) from the lower end of the liquid storage means. Due to the fact that the plurality of outlet holes are provided with the liquid dispersing pipe along the close-ended pipe, the liquid is evenly distributed when the liquid is injected from the plurality of outlet holes.

With the liquid dispersing pipe located above the evaporation pipe or absorption pipe, the liquid injected from the plurality of outlet holes evenly spreads over the evaporation pipe or absorption pipe respectively.

The liquid spreading over the evaporation pipe gives heat to the refrigerant liquid to evaporate it, and the liquid spreading over the absorption pipe deprives heat of the refrigerant vapor to release the heat.

With the liquid dispersing pipe used by forming the plurality of outlet holes on the close-ended pipe, it is possible to distribute the liquid upon dripping it, thus eliminating the necessity of a multitude of sheet metal pieces to significantly reduce the manufacturing cost.

With the liquid dispersing pipe communicated with the liquid storage means to inject the liquid under the pressure head, it is possible to equalize the amount of liquid injected through the plurality of outlet holes without inviting variations depending on the outlet holes.

According to another aspect of the invention, the plurality of outlet holes are perforated through an upper surface of the liquid dispersing pipe to inject the dripped liquid upward.

Due to the liquid injected from the upper surface of the liquid dispersing pipe, it is possible to flow down the liquid along the outer surfaces of the pipes, thus positively spreading the liquid extensively while flowing down along the outer surfaces of the pipes. This makes it possible to serve the liquid dispersing pipe as a topmost tier of the evaporation pipe or absorption pipe, thus making it possible to omit one tier from the evaporation pipe or absorption pipe.

With the holes oriented upward, it is possible to sink foreign matters on the bottom so as normally inject only the liquid when the foreign matters get mixed with the liquid while performing the absorption cycle. This obviates the foreign matters from clogging the outlet holes, thus ensuring a stable refrigerating performance.

According to another aspect of the invention, the liquid dispersing pipe has a circumferential outer surface section in which a plurality of groove-like sections are provided.

According to another aspect of the invention, the plurality of groove-like sections are formed by winding a line member or plate ribbon member around the liquid dispersing pipe in the manner to stride the plurality of outlet holes alternately.

According to another aspect of the invention, the plurality of groove-like sections are formed by cutting the circumferential outer surface section of the liquid dispersing pipe in which each of the plurality of outlet holes is provided.

It is possible to regulate the spread of the liquid injected from the plurality of outlet holes by the groove-like sections. This introduces the liquid in the direction guided by the groove-like sections due to the surface tension against the groove-like sections.

In order to form the groove-like sections, it is possible to wind the line member or plate ribbon member around the liquid dispersing pipe with its outlet hole forming outer surface as a bottom section.

It is also possible to form the groove-like sections by cutting the circumferential outer surface section of the liquid dispersing pipe. In this situation, the groove-like sections may be made by rotating the pipe-like member around its axis while applying a cutter to a pipe-like member.

According to another aspect of the invention, the liquid dispersing pipe has a plurality of close-ended pipes which are arranged to overlap each other, each of liquid inlet openings provided with the liquid storage means toward the plurality of close-ended pipes opens at different liquid level.

With the liquid level relatively low in the liquid storage means, the liquid flows into the liquid dispersing pipe which opens only at a lower liquid level within the liquid storage means without flowing into the liquid dispersing pipe which opens at a higher liquid level.

Therefore, it is possible to positively flow the liquid from the outlet holes situated at the lower liquid level while no flow occurs from the outlet holes situated at the higher liquid level. This means that the liquid injection occurs evenly from the plurality of outlet holes of the liquid dispersing pipe situated at the lower liquid level without concentrating the flow only on a part of the outlet holes at the time when the liquid in the liquid storage means and circulating through the absorption cycle is in short supply. This makes it possible to spread the liquid evenly over the evaporation pipe and the absorption pipe, thus maintaining a high evaporation and absorption capability thereon.

When the liquid in the liquid storage means is full, it is possible to flow the liquid into the outlet holes situated at the higher liquid level and fill all the outlet holes with the liquid so as to spread a large amount of the liquid evenly over the evaporation pipe and the absorption pipe.

According to another aspect of the invention, an open-ended pipe extended upward to open at an upper surface of the liquid dispersing pipe is connected to the liquid inlet opening opened at a lower liquid level in the liquid dispersing pipe within the liquid storage means of the evaporation pipe.

When the dripping device is used to what the refrigerant liquid is dripped toward the evaporation pipe, and the liquid in the liquid dispersing pipe situated at the lower liquid level evaporates within the liquid dispersing pipe before flowing out of the liquid dispersing pipe especially at the very beginning of the absorption cycle, the refrigerant vapor finds an escape path leading to the open-ended pipe. By determining a diameter of the open-ended pipe satisfactorily large, and setting an extension length of the open-ended pipe long enough, it is possible to positively release only the refrigerant vapor from the liquid dispersing pipe without overflowing the refrigerant liquid therefrom.

This obviates an admixture of the refrigerant liquid and vapor from flowing out of the outlet holes at once so as to positively drip only the refrigerant liquid over the evaporation pipe.

As a result, this prevents the refrigerant liquid from releasing in vain within the evaporator so as not to reduce the refrigerating capability when the liquid is in short supply at the time of rising up the operation.

According to another aspect of the invention, a syphon pipe is provided in the liquid dispersing pipe of the absorption pipe, one open end of the syphon pipe has one open end extending into the liquid dispersing pipe, and having the other open end exposing outside the liquid dispersing pipe at a level lower than a lower end of the liquid dispersing pipe.

With the liquid in the liquid dispersing pipe exhausted by the syphon pipe, it is possible to prevent the absorption liquid from residing in the liquid dispersing pipe at the time of suspending the absorption cycle. Therefore, no problem poses from residing the absorption liquid in the liquid dispersing pipe.

According to another aspect of the invention, the liquid dispersing pipe is shaped in the convoluted form of a single turn, one end of which is higher in level than the other end, and the liquid dispersing pipe being placed under the liquid storage means but situated above an evaporation coil and an absorption coil to be communicated with the lower end of the liquid storage means, and the plurality of outlet holes provided with the liquid dispersing pipe are diametrically increased progressively as oriented upward while diametrically reduced successively as directed downward.

Due to the fact that the liquid dispersing pipe has a difference in level, it is possible to equalize the amount of liquid injected from each of the outlet holes by diametrically increasing progressively the plurality of outlet holes provided with the liquid dispersing pipe as oriented upward while diametrically reducing successively as directed downward.

According to another aspect of the invention, the plurality of outlet holes provided with the liquid dispersing pipe progressively increase diametrically as a distance gains between a specified outlet hole of the plurality of outlet holes and a communicated section of the liquid dispersing pipe and the liquid storage means.

From the fact that the amount of liquid flowing from each of the outlet holes increases as approaching the communicated section, it is possible to equalize the amount of liquid injected from each of the outlet holes by increasing the outlet holes diametrically as the distance gains between the specified outlet hole of the plurality of outlet holes and the communicated section of the liquid dispersing pipe and the liquid storage means.

BRIEF DESCRIPTION OF THE DRAWINGS

Preferred forms of the present invention are illustrated in the accompanying drawings in which.

| DESCRIPTION OF THE NUMERALS | |
|---|---|
| 100 | absorption type refrigerator |
| 1 | high temperature regenerator (regenerator) |
| 2 | low temperature regenerator (regenerator) |
| 3 | absorption means (absorption device) |
| 31 | absorption coil |
| 32 | high concentration absorption liquid spray tool (dripping device.) |
| 320 | absorption liquid storage means (liquid storage reservoir) |
| 321 | absorption liquid dispersing pipe (liquid dispersing pipe, close-ended pipe convoluted in shape of a single turn) |
| 322 | absorption liquid outlet pipe |
| 323 | outlet holes (a plurality of holes) |
| 324 | groove-forming ring (line member, plate ribbon member, generally groove-like member) |
| 324a | groove-forming ring (line member, plate ribbon member, groove-like member) |
| 324b | groove (generally groove-like member) |
| 325 | syphone pipe |
| 4 | evaporator |
| 41 | evaporation coil |
| 42 | refrigerant liquid spray tool (dripping device) |
| 420 | refrigerant liquid storage means (liquid storage reservoir) |
| 421 | refrigerant liquid dispersing pipe (liquid dispersing pipe, close-ended pipe convoluted in shape of a single turn) |
| 423, 424 | refrigerant outlet pipe |
| 426 | outlet holes (a plurality of holes) |
| 427 | groove-forming ring (line member, plate ribbon member, generally groove-like member) |
| 428 | open-ended pipe member |
| 5 | condenser |
| P1 | absorption liquid pump (pump) |

BEST MODE FOR CARRYING OUT THE INVENTION

Figure 1:
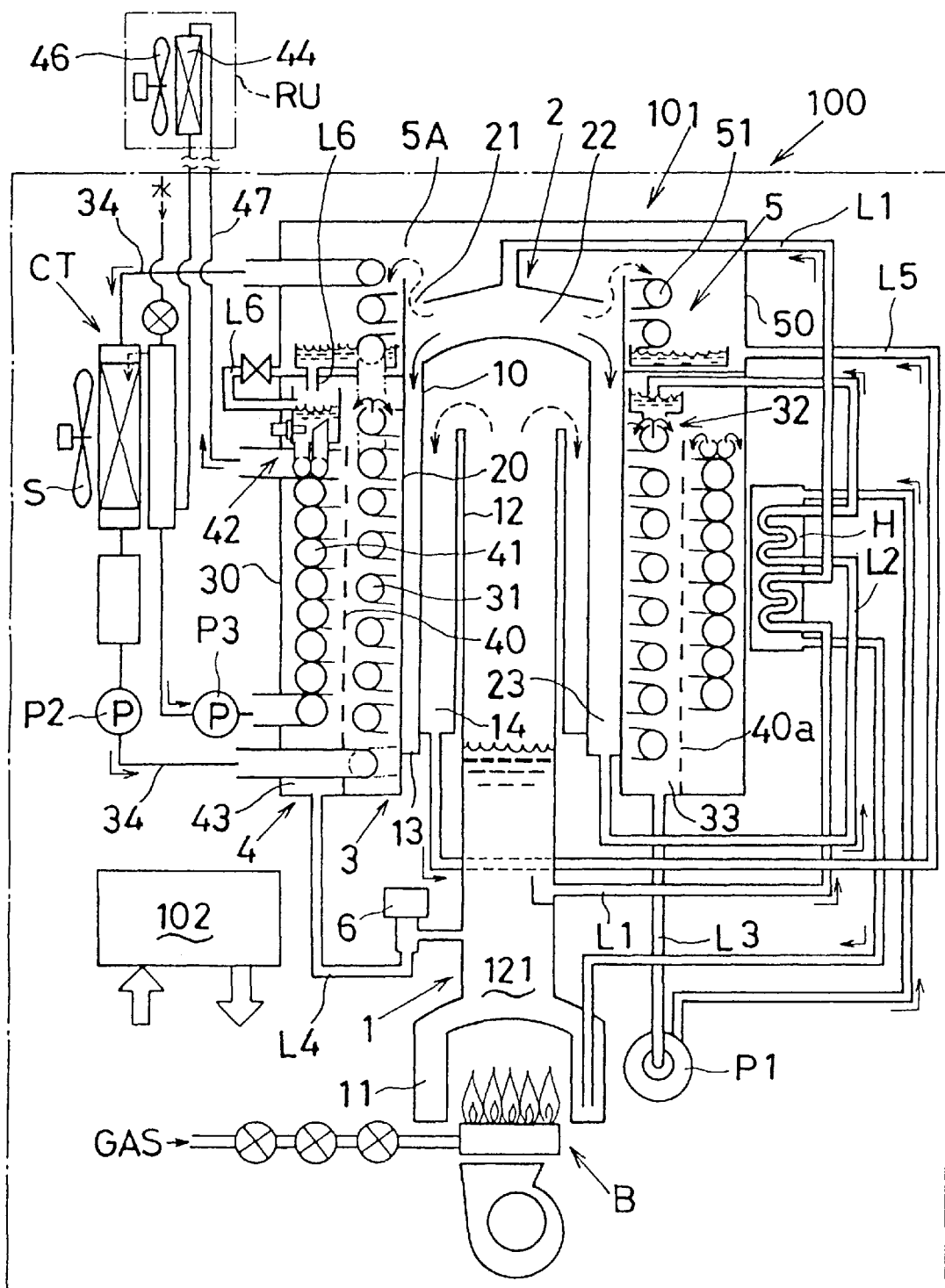
FIG. 1 is a schematic view of an air conditioner into which an absorption type refrigerator is incorporated according to a first embodiment of the invention.

Referring to FIG. 1 which schematically shows an air conditioner according to the present invention, the air conditioner has an absorption type refrigerator 100 as an outdoor apparatus and an indoor apparatus RU. The absorption type refrigerator 100 has a refrigerator 101 and a cooling tower CT. The air conditioner is controlled by a control device 102.

The refrigerator 101 forms an absorption cycle for lithium bromide liquid which serves as a refrigerant and absorption liquid medium. In the refrigerator 101, a double harness type regenerator is provided which has a high temperature regenerator 1 having a gas-fired burner B thereunder and a low temperature regenerator 2 placed to enclose the high temperature regenerator 1. Around the low temperature regenerator 2, an absorption device 3 and an evaporator 4 are provided respectively. Above the absorption device 3, a condenser 5 is provided which is connected to the aforementioned component parts through a multitude of refrigerant liquid running paths.

In the high temperature regenerator 1, a mid-concentration absorption liquid separation cylinder 12 is placed above a heating tank 11 which is heated by the gas-fired burner B. A cylindrical refrigerant retrieve tank 10 is placed to air-tightly embrace an upper open end of the mid-concentration absorption liquid separation cylinder 12. When the gas-fired burner B heats a low concentration absorption liquid stored in the heating tank 11 to evaporate aqueous component in the low concentration absorption liquid to separate it outside the mid-concentration absorption liquid separation cylinder 12 as a refrigerant vapor (aqueous vapor). The low concentration absorption liquid concentrated due to the aqueous evaporation is left at a storage portion 121 within the mid-concentration absorption liquid separation cylinder 12 while retrieving the separated refrigerant vapor by the retrieve tank 10.

The low temperature regenerator 2 has a low temperature regenerator cylinder casing 20 eccentrically placed around the retrieve tank 10. The low temperature regenerator cylinder casing 20 has an upper open end portion, a peripheral area of which serves as an outlet opening 21 for the refrigerant vapor.

The upper open end portion of the low temperature regenerator cylinder casing 20 is connected to the storage portion 121 of the mid-concentration absorption liquid separation cylinder 12 by way of a mid-concentration absorption liquid path L1 and a heat exchanger H.

Within the mid-concentration absorption liquid path L1, an orifice (not shown) is provided to regulate the mid-concentration absorption liquid flowing from the storage portion 121 to the low temperature regenerator 2 so as to supply the mid-concentration absorption liquid to the low temperature regenerator cylinder casing 20 due to the pressure difference against the mid-concentration absorption liquid separation cylinder 12.

In this instance, the pressure is represented by approx. 70 mmHg within the low temperature regenerator cylinder casing 20 while represented by approx. 700 mmHg within the mid-concentration absorption liquid separation cylinder 12.

At the low temperature regenerator 2, the mid-concentration absorption liquid is reheated through an outer wall of the refrigerant retrieve tank 10. The mid-concentration absorption liquid is separated into the refrigerant vapor and the high concentration absorption liquid at a gas-liquid separation section 22 provided at an upper portion of the low temperature regenerator cylinder casing 20. The high concentration absorption liquid is stored by a high concentration absorption liquid saucer 23.

Around the low temperature regenerator cylinder casing 20, an evaporation-absorption cylinder casing 30 and the condenser casing 50 are concentrically provided air-tightly at a lower portion and upper portion thereof. The refrigerant retrieve tank 10, the low temperature regenerator cylinder casing 20 and the evaporation-absorption cylinder casing 30 are welded together through a bottom plate 13 so as to form the refrigerator 101.

In this situation, the low temperature regenerator cylinder casing 20 is communicated with the condenser casing 50 via the outlet opening 21 and a clearance 5A.

In the absorption device 3, an absorption coil 31 (although schematically depicted in FIG. 1) is placed within the evaporation-absorption cylinder casing 30 so as to flow the cooling water therethrough. Above the absorption coil 31, a high concentration absorption liquid spray tool 32 is placed to drip the high concentration absorption liquid over the absorption coil 31.

In reference to FIGS. 2 and 3, described below is the absorption coil 31 made of a copper metal in a first embodiment of the invention.

Figure 2:
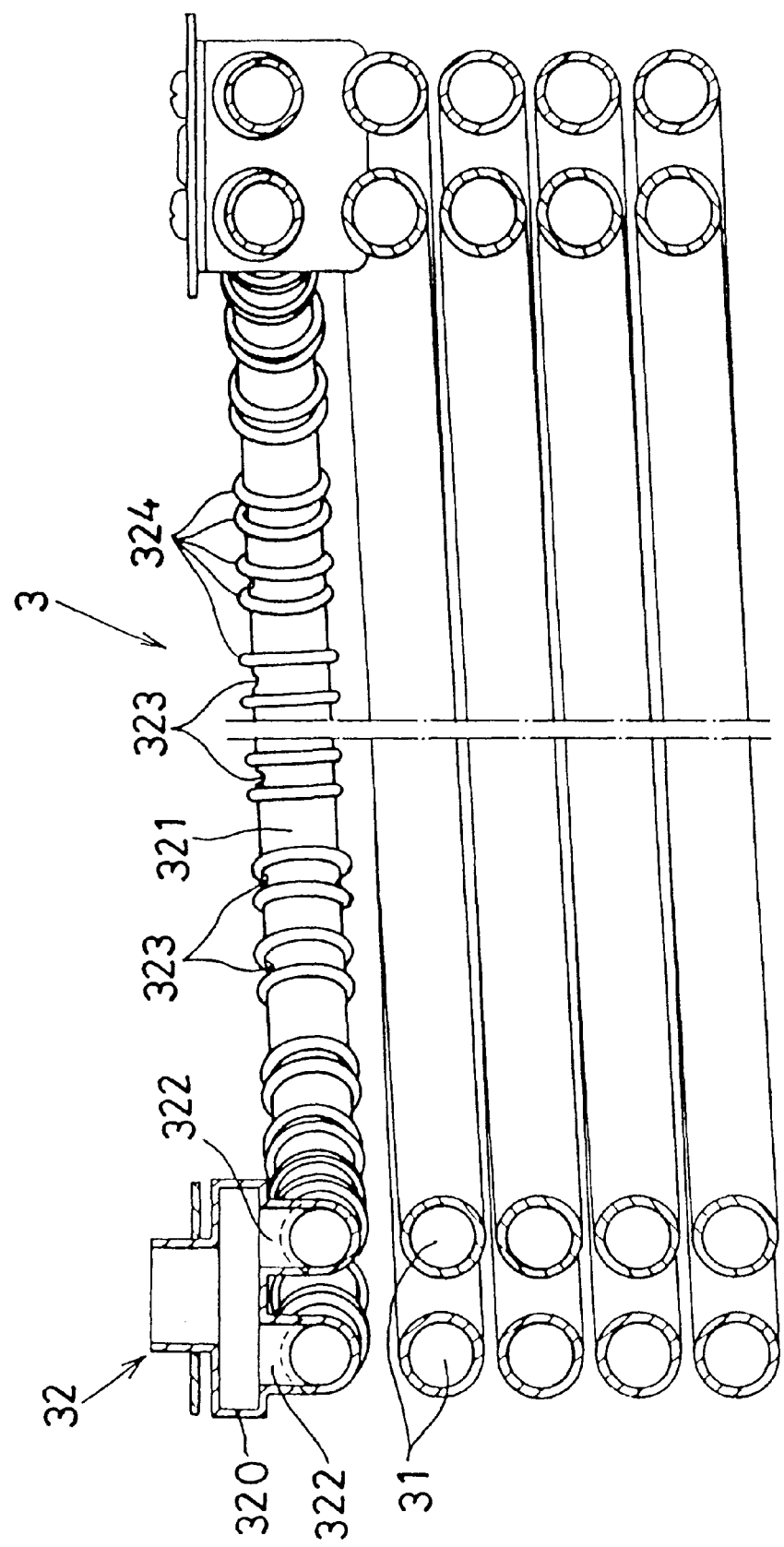
FIG. 2 is a longitudinal cross sectional view of a high concentration absorption liquid spray tool and an absorption coil in an absorption means.

The absorption coil 31 of the absorption device 3 is vertically arranged at regular pitches in double helical spiral configuration as shown in FIG. 2.

The high concentration absorption liquid spray tool 32 has an absorption liquid storage reservoir 320 and an absorption liquid dispersing pipe 321. The absorption liquid storage reservoir 320 receives the high concentration absorption liquid supplied via a high concentration absorption liquid path L2 which is connected to the high concentration absorption liquid saucer 23 via the heat exchanger H. The absorption liquid dispersing pipe 321 has two circular pipes concentrically disposed immediately above the absorption coil 31 so as to drip the absorption liquid evenly over the absorption coil 31. The absorption liquid storage reservoir 320 and the absorption liquid dispersing pipe 321 are each made of a stainless steel alloy.

At a bottom base of the absorption liquid storage reservoir 320, two absorption liquid outlet pipes 322 are provided which are communicated with the absorption liquid dispersing pipe 321 so as to distribute the absorption liquid of the storage reservoir 320 to the absorption liquid dispersing pipe 321.

Figure 3:
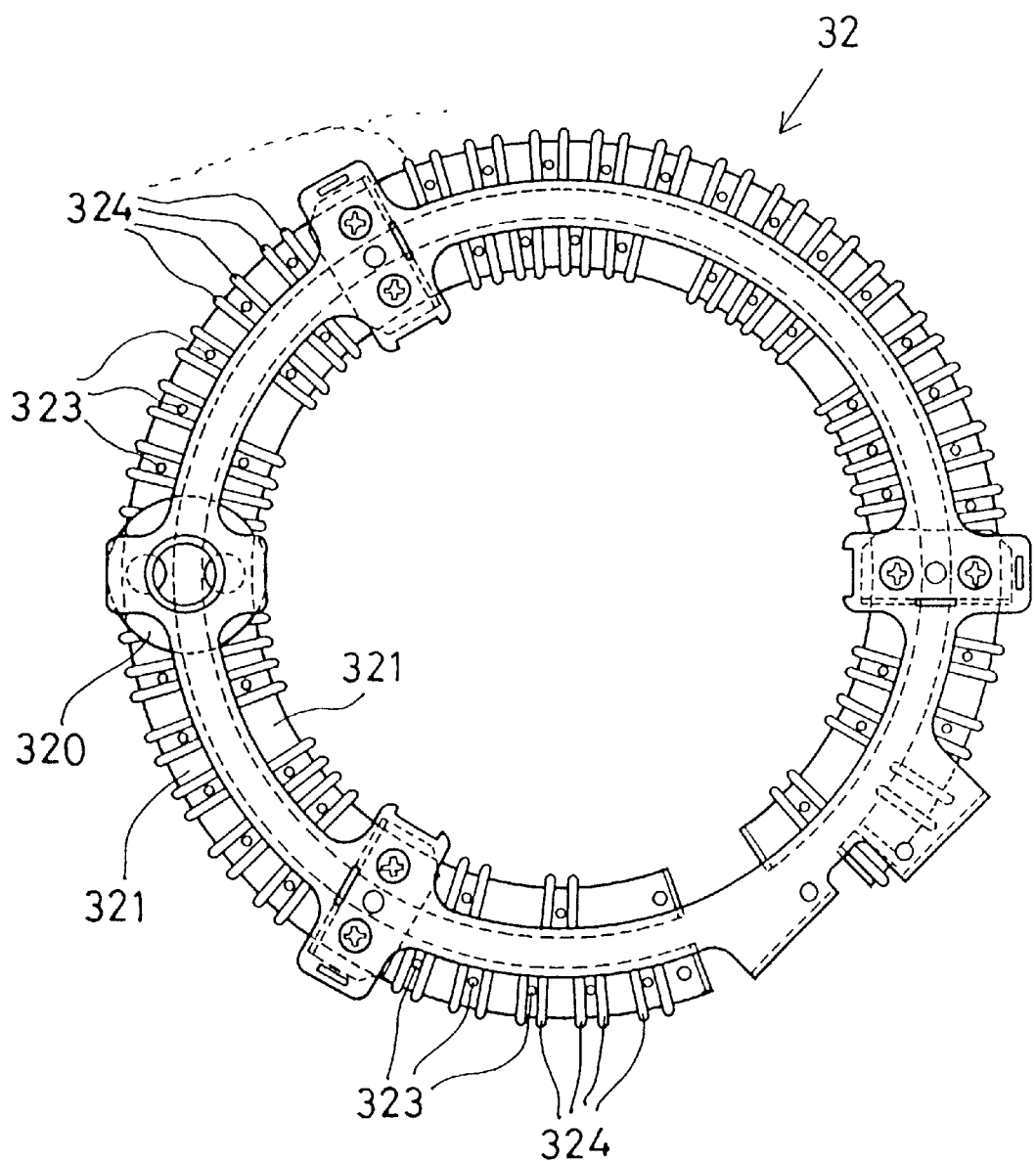
FIG. 3 is a plan view of the high concentration absorption liquid spray tool in the absorption means.

The absorption liquid dispersing pipe 321 is in the form of a single turn convoluted pipe closed at both ends as shown in FIG. 3. The absorption liquid dispersing pipe 321 tilts along the topmost absorption coil 31 immediately above the absorption coil 31. An upper surface of the absorption liquid dispersing pipe 321 has a multitude of outlet holes 323 in its axial direction so as to flow out the absorption liquid therethrough.

In the absorption liquid dispersing pipe 321, a connection portion between the absorption liquid storage reservoir 320 and the absorption liquid outlet pipes 322 positions at approx. one-third the diametrical dimension from a lower end of the absorption liquid dispersing pipe 321.

With the structure described above, the absorption liquid is injected from the outlet holes 323 of the absorption liquid dispersing pipe 321 due to the pressure head of the absorption liquid resided in the storage reservoir 320. This substantially equalizes an amount of the refrigerant liquid injected from the outlet holes 323 under the circumstances in which the absorption liquid dispersing pipe 321 is tilted along the absorption coil 31.

This holds true when the high concentration absorption liquid spray tool 32, i.e., the refrigerator 100 tilts by, for example, 1.0 degree against the horizontal direction at the time when installing the refrigerator 100.

Considering the vertical relationship between the outlet holes 323 since the absorption liquid dispersing pipe 321 is tilted, it is possible to diametrically decrease the outlet holes 323 (e.g., ø0.6 mm) progressively as positioned downward while diametrically increasing the outlet holes 323 (e.g., ø0.8 mm) progressively as positioned upward. This substantially equalizes the amount of liquid injected from the outlet holes 323 due to the pressure head difference between the height of the outlet holes 323 and the liquid level in the absorption liquid storage reservoir 320.

In the absorption liquid dispersing pipe 321, groove-forming rings 324 are circumferentially provided on the absorption liquid dispersing pipe 321 in the manner to stride the outlet holes 323 alternately so as to form groove-like configurations. The groove-forming rings 324 are each made of a stainless steel line member, and press-fit into an outer surface of the absorption liquid dispersing pipe 321.

Figure 4:
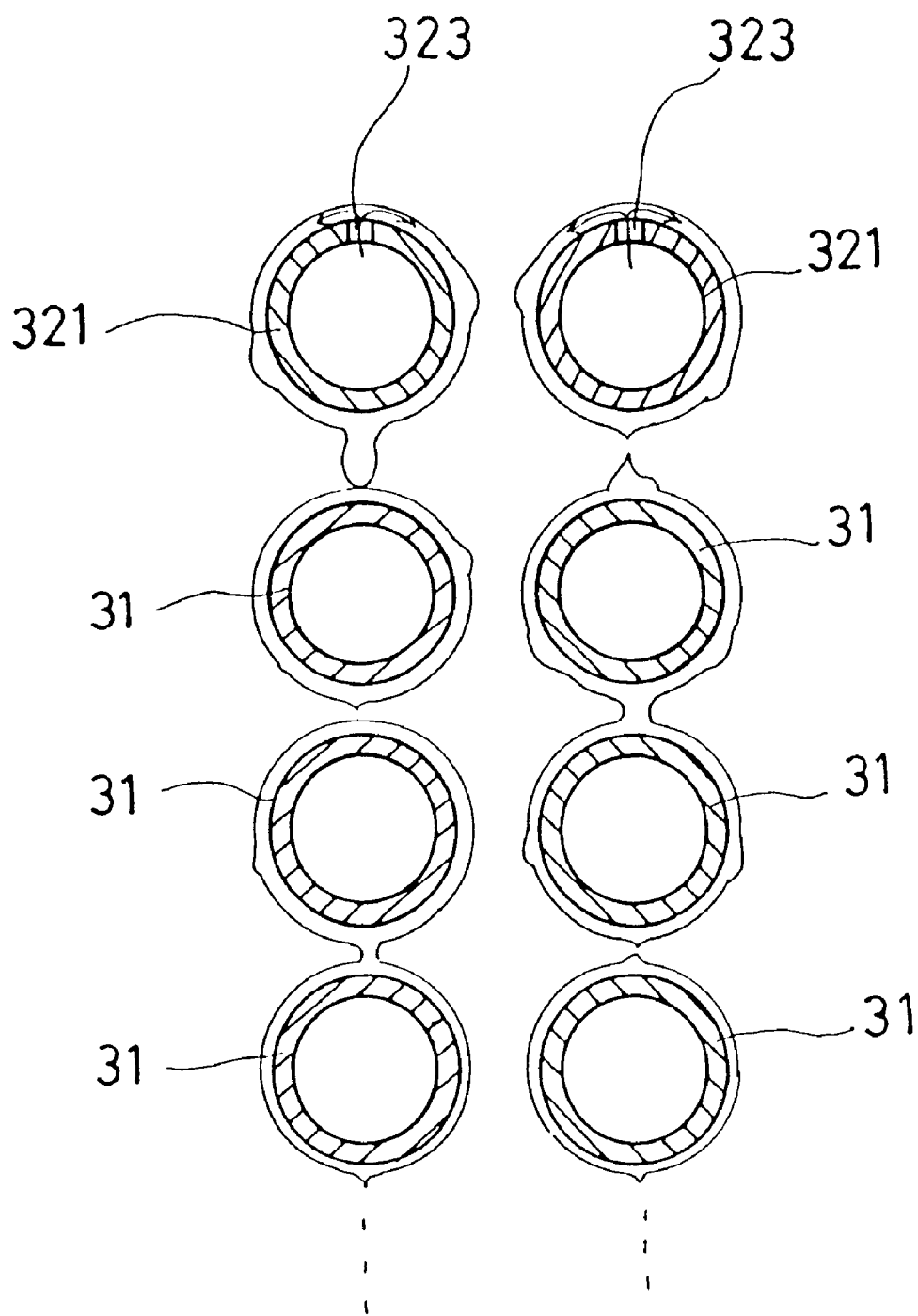
FIG. 4 is a longitudinal cross sectional view of the absorption coil to explain how an absorption liquid is dripped toward the absorption coil from the high concentration absorption liquid spray tool in the absorption means.

This gives the absorption liquid a tendency to flow toward the groove-like configurations formed between the paired groove-forming rings 324, 324, and guiding the absorption liquid toward the absorption coil 31 in the downward direction opposite to where the outlet holes 323 reside without flowing along the absorption liquid dispersing pipe 321 as shown in FIG. 4.

Into the absorption device 3, the high concentration absorption liquid flows via the high concentration absorption liquid path L2 due to the pressure head difference. The high concentration absorption liquid flowed into the absorption device 3 is sprayed over the absorption coil 31 by means of the high concentration absorption liquid spray tool 32. The high concentration absorption liquid sprayed over the absorption coil 31 flows in a film-like curtain downward under the influence of gravity, and absorbing the aqueous vapor to transform into the low concentration absorption liquid. The heat induced when absorbing the aqueous vapor is cooled down by the cooling water circulating through the absorption coil 31. In this instance, the aqueous vapor absorbed by the absorption liquid is due to the refrigerant vapor induced in the evaporator 4 as described hereinafter.

A bottom portion 33 of the absorption device 3 is communicated with a bottom portion of the heating tank 11 at a low concentration absorption liquid path L3, to which the heat exchanger H and the absorption liquid pump P1 are secured.

Due to the action of the pump P1, the low concentration absorption liquid of the absorption device 3 is sent to the heating tank 11. Through the absorption coil 31, the cooling water circulates which is cooled by the cooling tower CT when implementing an air cooling operation.

The evaporator 4 is in the form of a evaporation coil 41, and provided around the absorption coil 31 through a cylindrical partition 40 which has a communication hole 40a. Above the evaporation coil 41, a refrigerant liquid spray tool 42 is provided to circulate the low temperature water to implement the air warming and cooling operation. In this instance, a bottom portion 43 of the evaporator 4 is communicated with a bottom portion of the storage portion 121 of the mid-concentration absorption liquid separation cylinder 12 via an air warming absorption liquid path L4 in which an electromagnetic valve 6 is provided.

Figure 6:
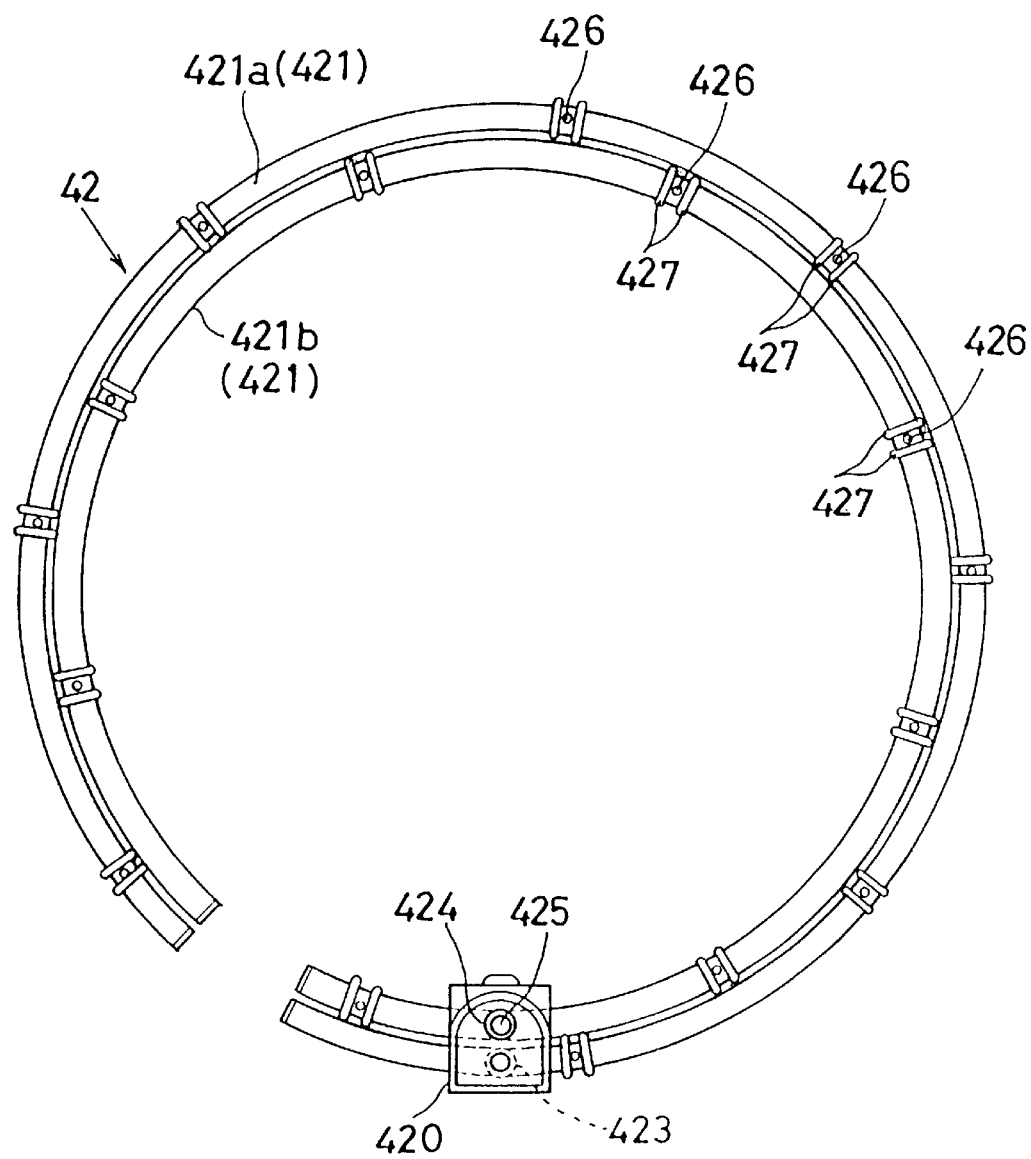
FIG. 6 is a plan view of the refrigerant liquid spray tool in the evaporator.
Figure 7:
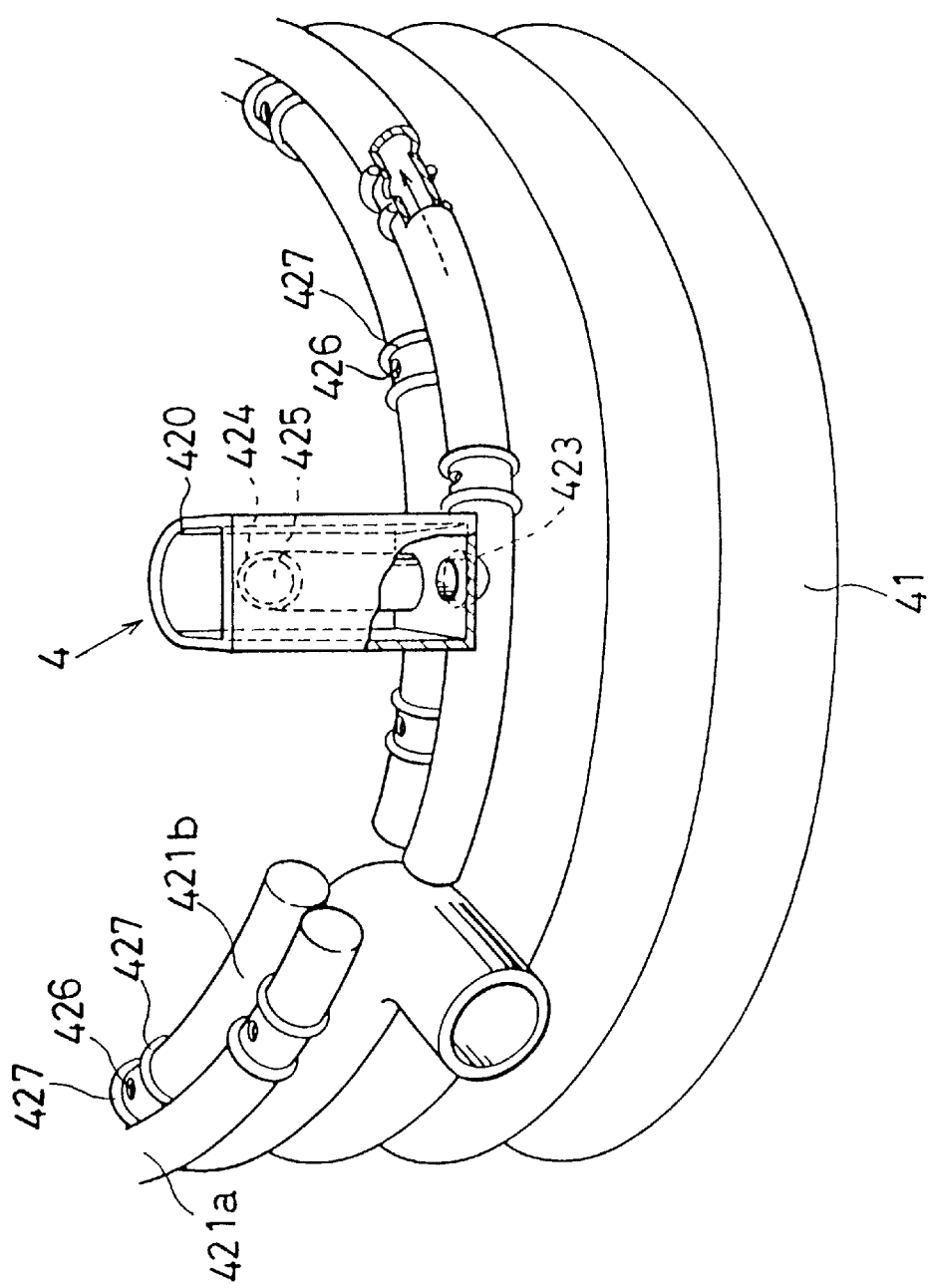
FIG. 7 is a partial perspective view of the refrigerant liquid spray tool and the evaporation coil in the evaporator.

In reference to FIGS. 5~7, described below is the evaporator 4 in the first embodiment of the invention.

Figure 5:
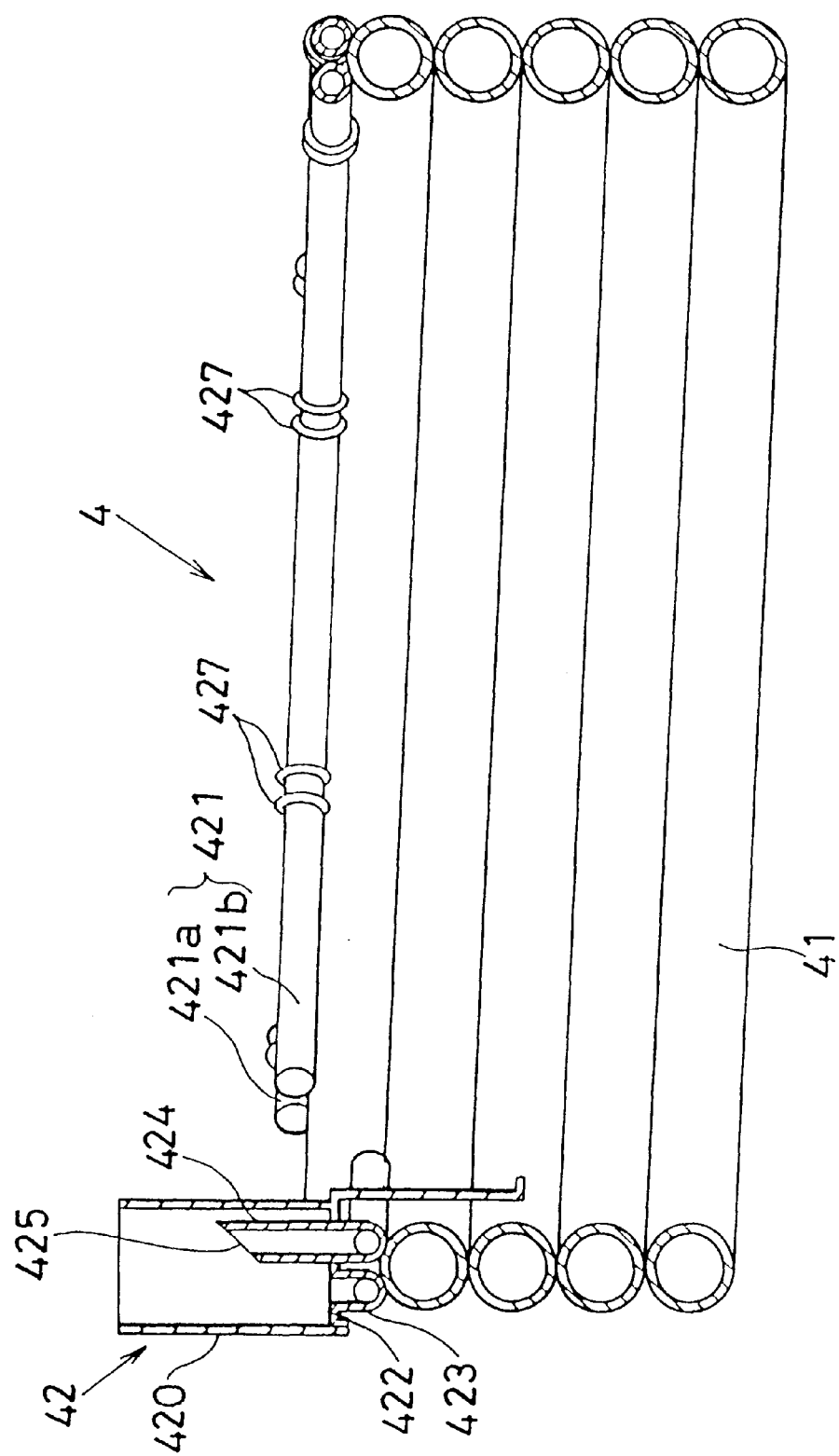
FIG. 5 is a longitudinal cross sectional view of a refrigerant liquid spray tool and an evaporation coil in an evaporator.

In the evaporator 4, as opposed to the absorption coil 31, the evaporation coil 41 is in the form of a single turn spiral configuration as shown in FIG. 5. The evaporation coil 41 is wound from its upper portion to lower portion in the clockwise direction without forming clearance between the respective line elements thereof.

The refrigerant liquid spray tool 42 of the evaporator 4 has a refrigerant liquid reservoir 420 and two refrigerant liquid dispersing pipes 421 (421a, 421b) each placed concentrically. The refrigerant liquid reservoir 420 receives the refrigerant liquid supplier from the condenser 5 as described in detail hereinafter. The refrigerant liquid dispersing pipes 421 (421a, 421b) distribute the refrigerant liquid evenly to an inner and outer side of the evaporation coil 41 when dripping the refrigerant liquid stored in the refrigerant liquid reservoir 420. The refrigerant liquid reservoir 420 and the refrigerant liquid dispersing pipes 421 are each made of a stainless steel alloy.

On an outer area of a bottom base 422 of the refrigerant liquid reservoir 420, a refrigerant outlet; pipe 423 is provided to communicate with the refrigerant liquid dispersing pipe 421a. On an inner area of the bottom base 422 of the refrigerant liquid reservoir 420, a refrigerant outlet pipe 424 is provided to communicate with the refrigerant liquid dispersing pipe 421b. A front end of the refrigerant outlet pipe 424 vertically extends within the refrigerant liquid reservoir 420 so as to form an elevated opening 425.

The elevated opening 425 has such a shape as the front end of the refrigerant outlet pipe 424 is sectioned slantwisely against its axial direction. Such is the elevated opening 425 that the surface tension does not block the refrigerant liquid flowing from the refrigerant liquid reservoir 420 to the elevated opening 425.

When the liquid level of the refrigerant liquid reservoir 420 is lower than the elevated opening 425 of the refrigerant outlet pipe 424, the refrigerant liquid in the reservoir 420 is supplied to the refrigerant liquid dispersing pipe 421a via the refrigerant outlet pipe 423 without introducing it into the refrigerant liquid dispersing pipe 421b. Only when the liquid level of the refrigerant liquid reservoir 420 is higher than the elevated opening 425 of the refrigerant outlet pipe 424, the refrigerant liquid in the reservoir 420 is supplied to the refrigerant liquid dispersing pipe 421b via the refrigerant outlet pipe 424.

The refrigerant liquid dispersing pipes 421a, 421b are concentrically located on a topmost portion of the evaporation coil 41. Each of the refrigerant liquid dispersing pipes 421a, 421b is in the form of a single turn spiral configuration with both ends closed as shown in FIGS. 6 and 7. The refrigerant liquid dispersing pipes 421a, 421b are wound such that they descend while turning spirally in the clockwise direction. On an upper surface of the refrigerant liquid dispersing pipes 421a, 421b, a multitude of outlet holes 426 are provided to inject the refrigerant liquid supplied thereto.

A connection portion between the bottom base of the refrigerant liquid reservoir 420 and the refrigerant outlet pipes 423, 424 is located in the proximity of the descended ends of the refrigerant liquid dispersing pipes 421.

Considering the vertical relationship between the outlet holes 426 since the refrigerant liquid dispersing pipe 421 is tilted, it is possible to diametrically decrease the outlet holes 426 progressively as positioned downward while diametrically increasing the outlet holes 426 progressively as positioned upward. This substantially equalizes the amount of the refrigerant liquid injected from the outlet holes 426 due to the pressure head difference between the height of the outlet holes 426 and the liquid level in the refrigerant liquid reservoir 420.

By progressively increasing the diameter of the outlet holes 426 as being away from the connection portion between the refrigerant liquid reservoir 420 and the refrigerant outlet pipes 423, 424, it is possible to equalize the amount of the refrigerant liquid injected from the outlet holes 426.

In the same manner as the high concentration absorption liquid spray tool 32, the refrigerant liquid is injected from the outlet holes 426 of the refrigerant liquid dispersing pipe 421 in the refrigerant liquid spray tool 42. This is due to the pressure head of the absorption liquid resided in the refrigerant liquid reservoir 420. This substantially equalizes an amount of the refrigerant liquid injected from the outlet holes 426 under the circumstances in which the refrigerant liquid dispersing pipe 121 is tilted along the evaporation ccil 41.

This holds true when the refrigerant liquid spray tool 42, i.e., the refrigerator 100 tilts by, for example, 1.0 degree against the horizontal direction at the time when installing the absorption type refrigerator 100.

In the refrigerant liquid dispersing pipe 421, groove-forming rings 427 are circumferentially provided on the refrigerant liquid dispersing pipe 421 between each of the outlet holes 426 so as to form groove-like configurations. The groove-forming rings 427 are each made of a stainless steel line member, and press-fit into an outer surface of the refrigerant liquid dispersing pipe 421.

Figure 8:
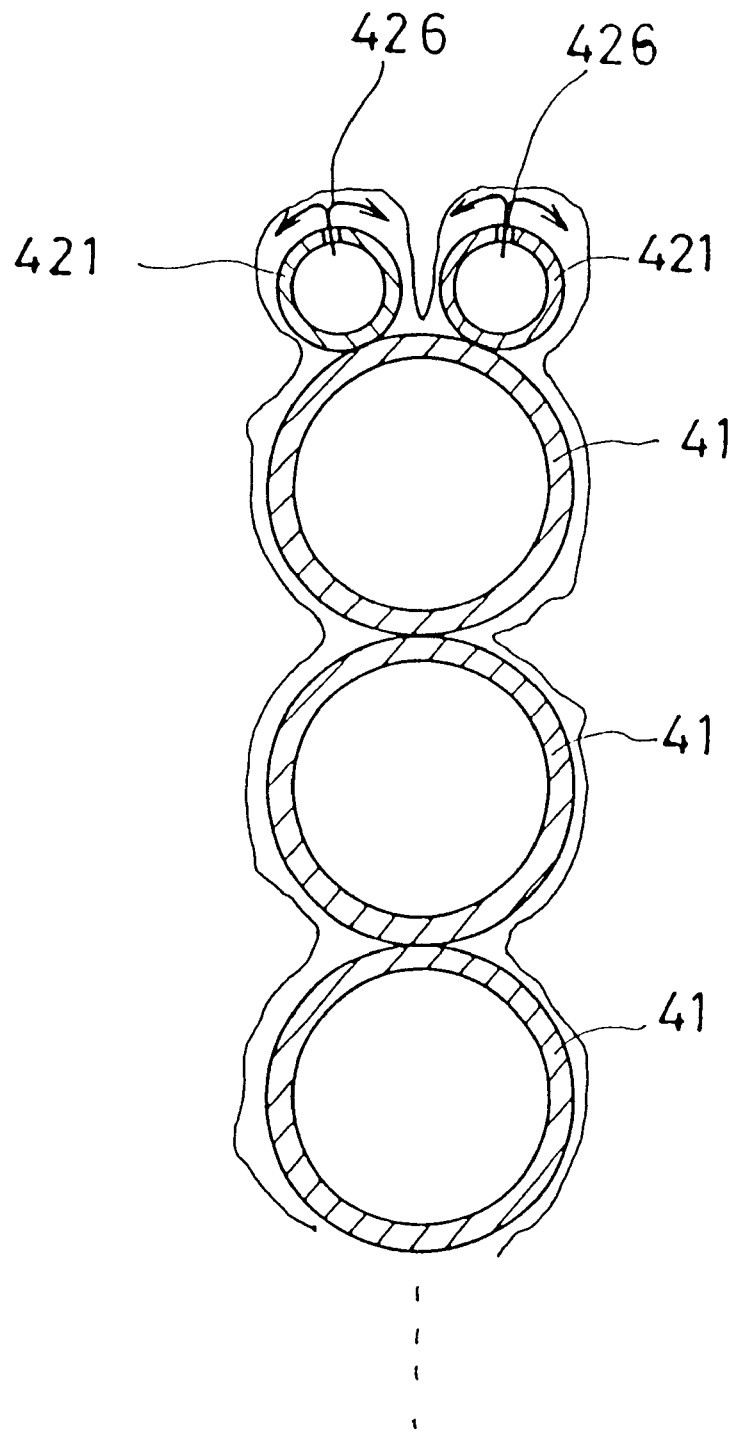
FIG. 8 is a longitudinal cross sectional view of the evaporation coil to explain how a refrigerant liquid is dripped toward the evaporation coil from the refrigerant liquid spray tool in the evaporator.

This gives the refrigerant liquid the tendency to run toward the groove-like configurations formed between the paired groove-forming rings 427, 427, and guiding the refrigerant liquid toward the evaporation coil 41 in the downward direction opposite to where the outlet holes 426 reside without diverting along the refrigerant liquid dispersing pipe 421 as shown in FIG. 8.

In the evaporation device 4, when the refrigerant liquid (water) is dripped over the evaporation coil 41 by means of the refrigerant liquid spray tool 42 at the time of implementing the air cooling operation. The refrigerant liquid dripped over the evaporation coil 41 flows downward under the influence of gravity while forming a film-like curtain over the evaporation coil 41 due to the surface tension. Then, the refrigerant liquid deprives the heat of the evaporation coil 41 placed within the evaporation-absorption cylinder casing 30 in which the pressure is represented by e.g., 6.5 mmHg. The refrigerant liquid evaporates to cool down the low temperature water circulating through the evaporation coil In this instance, the refrigerant liquid flow out upward first and then spreads over the refrigerant liquid dispersing pipe 421 before dripping along the evaporation coil 41. This ameliorates an efficiency of the liquid dispersion performance.

The condenser 5 has a cooling coil 51 placed within the condenser casing 50 to circulate the cooling water cooled by the cooling tower CT.

The condenser casing 50 communicates with the lower end 14 of the refrigerant retrieve tank 10 via a refrigerant passage path L5 in which an orifice (not shown) is provided to regulate the refrigerant flowing from the retrieve tank 10 to the condenser casing 50. The condenser casing 50 also communicates with the low temperature regenerator 2 via the clearance 5A and the outlet opening 21 for the refrigerant vapor. The refrigerant is supplied by the pressure difference (approx. 70 within the condenser casing).

The refrigerant vapor supplied to the condenser casing 50 is condensed to form a liquid by means of the cooling coil 51. A lower portion of the condenser 5 communicates with the refrigerant liquid spray tool 42 by way of a refrigerant liquid supply path L6. The vaporized refrigerant is supplied to the refrigerant liquid spray tool 42 via a refrigerant cooling device (not shown).

The absorption liquid circulates from the high temperature regenerator 1→mid-concentration absorption liquid path L1→low temperature regenerator 2→high concentration absorption liquid path L2→absorption device 3→absorption liquid pump P1→low concentration absorption liquid path L3 again to the high temperature regenerator 1.

The refrigerant liquid circulates from the high temperature regenerator 1 (refrigerant vapor)→refrigerant passage path L5 (refrigerant vapor) or low temperature regenerator 2 (refrigerant vapor)→condenser 5 (refrigerant liquid) →refrigerant liquid supply path L6 (refrigerant liquid) →refrigerant liquid spray tool 42 (refrigerant liquid) →evaporator 4 (refrigerant vapor)→absorption device 3 (absorption liquid)→absorption liquid pump P1→low concentration absorption liquid path L3 again to the high temperature regenerator 1.

The absorption coil 31 and the cooling coil 51 are connected to form a consecutive coil which is further connected to the cooling tower CT via a cooling water path 34 so as to form a cooling water circulation path.

In the cooling water path 34 between an inlet of the absorption coil 31 and the cooling tower CT, a cooling water pump P2 is provided to feed the cooling water to the consecutive coil. The cooling water running through the consecutive coil is sent to the cooling tower CT while depriving the heat of the absorption coil 31 and the cooling coil 51 respectively.

Upon implementing the air cooling operation, the cooling water pump P2 circulates the cooling water from the cooling tower CT→cooling water pump P2→absorption coil 31→cooling coil 51 again to the cooling tower CT.

Within the cooling tower CT, cooling water is self-cooled by evaporating a part of the cooling water outside the cooling tower CT. The heat is released from the cooling water to form a heat-releasing cycle. The aqueous evaporation is facilitated by a blower S.

To the evaporation coil 41 of the evaporator 4, an air conditioning heat exchanger 44 disposed in the indoor apparatus RU is connected by way of a low temperature water path 47 in which a low temperature water pump P3 is provided.

The low temperature water cooled down by the evaporation coil 41 circulates from the evaporation coil 41→low temperature water path 47→air conditioning heat exchanger 44→low temperature water path 47→low temperature water pump P3 again to the evaporation coil 41.

Within the indoor apparatus RU, a blower 46 is provided to introduce the air indoor through the air conditioning heat exchanger 44.

An air warming absorption liquid path L4 and electromagnetic valve 6 are used to implement the air warming operation by opening the electromagnetic valve 6 while driving the absorption liquid pump P1.

With the absorption liquid pump P1 thus driven, the mid-concentration absorption liquid flows into the evaporator 4 from the storage portion 121 of the mid-concentration absorption liquid separation cylinder 12. The mid-concentration absorption liquid flowed into the evaporator 4 heats the low temperature water circulating through the evaporation coil 41 to be fed to the air conditioning heat exchanger 44 via the low temperature water path 47 so as to serve as an air warming medium source.

With the use of the absorption liquid pump P1, the mid-concentration absorption liquid is fed from the evaporator 4 to the absorption device 3 via the communication hole 40a of the partition 40 to return to the heating tank 11.

With the high concentration absorption liquid spray tool 32 and the refrigerant liquid spray tool 42 each provided by the liquid reservoirs 320, 420 and the liquid dispersing pipes 321, 421 on which the outlet holes 323, 426 are formed, it is possible to significantly reduce the number of component parts. Due to the fact that the outlet holes 323, 426 are provided by simply drilling the close-ended pipe, this leads to a significant manufacturing cost reduction.

The outlet holes 323, 426 on the liquid dispersing pipes 321, 421 are such that the liquid spreads over the liquid dispersing pipes 321, 421. This makes it possible to omit a single turn of the absorption coil 31 and the evaporation coil 41 to make them compact as a whole because the pipes 321, 421 serve as the topmost tiers of the absorption coil 31 and the evaporation coil 41.

Due to the fact that the liquid is injected from the outlet holes 323, 426 with the use of the pressure head, it is possible to normally inject the liquid when the refrigerator 100 is tilted in some degree against the horizontal plane at the time of installing the absorption type refrigerator 100. It is also possible to equalize the amount of refrigerant liquid injected from the outlet holes 323, 426. This eliminates the necessity of strictly attending to the horizontality, thus improving the workability at the time of installing the absorption type refrigerator 100.

Figure 9:
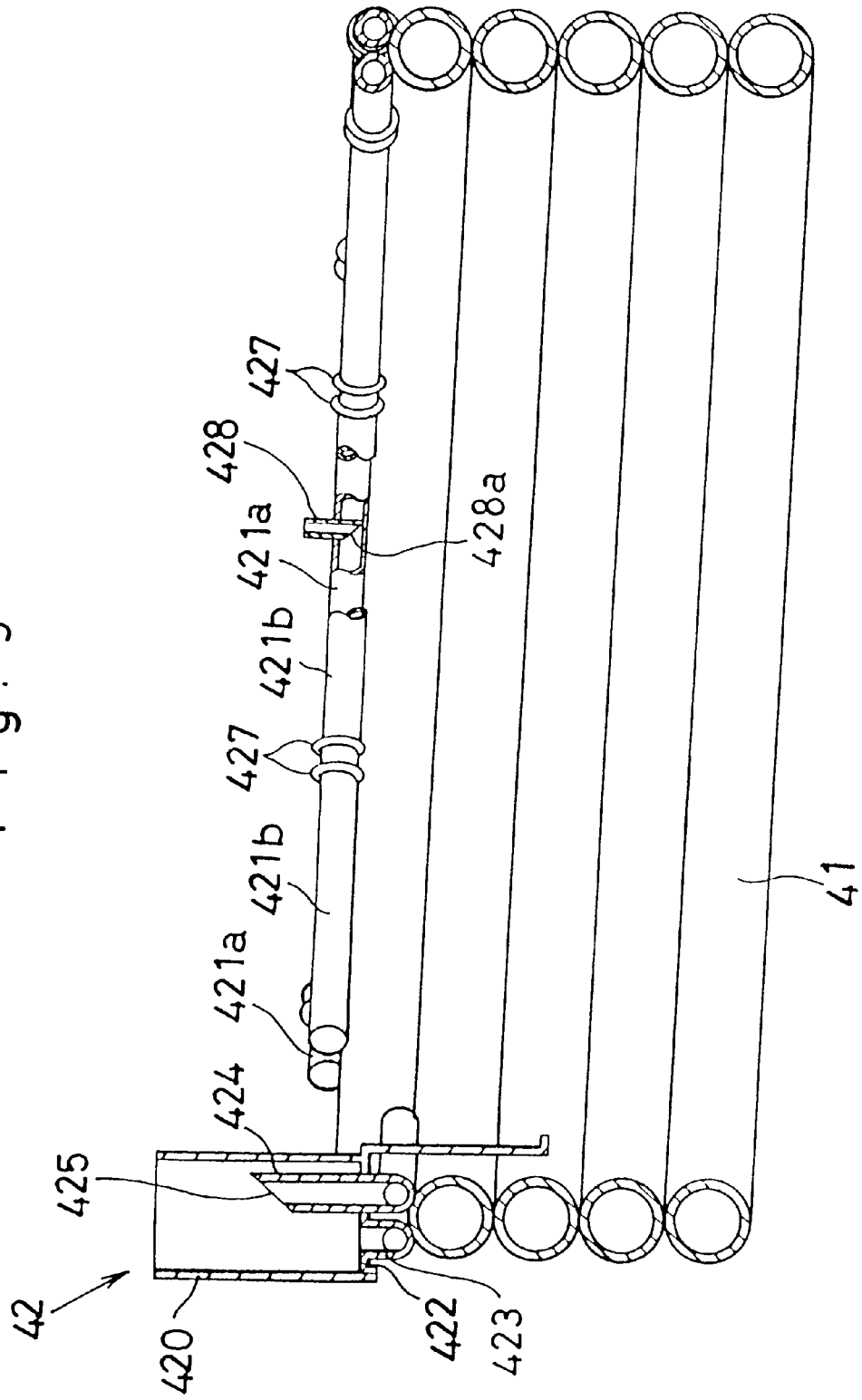
FIG. 9 is a longitudinal cross sectional view of a refrigerant liquid spray tool in the evaporator according to a second embodiment of the invention.

FIG. 9 shows a second embodiment of the invention. In the refrigerant liquid spray tool 42 which drips the refrigerant liquid over the evaporation coil 41, it is aimed to mitigate the refrigerant liquid coupled with the vapor from flowing out of the refrigerant liquid dispersing pipe 421 particularly when the refrigerant liquid is in short supply and evaporates in the refrigerant liquid dispersing pipe 421 at the very time of starting the air cooling operation.

In more concrete terms, an open-ended pipe 428 is provided on the refrigerant liquid dispersing pipe 421 located between the refrigerant liquid reservoir 420 and the distal end of the refrigerant liquid dispersing pipe 421. The open-ended pipe 428 escapes the refrigerant vapor to drop the pressure within the refrigerant liquid dispersing pipe 421. In the second embodiment of the invention, the open-ended pipe 428 is placed at two locations on the refrigerant liquid dispersing pipe 421a.

The open-ended pipe 428 has a slantwise open section 428a pierced through an upper surface of the refrigerant liquid dispersing pipe 421a thereinto, and secured to refrigerant liquid dispersing pipe 421a by means of welding or soldering. The open-ended pipe 428 has a diameter (e.g., ⌀1.0 mm) greater than each of the outlet holes 426.

This substantially helps escape the refrigerant vapor out of the refrigerant liquid dispersing pipe 421a via the open-ended pipe 428 even when the refrigerant liquid evaporates before flowing out of the outlet holes 426, thus preventing the refrigerant liquid coupled with the vapor from flowing out of the refrigerant liquid dispersing pipe 421a.

Figure 10:
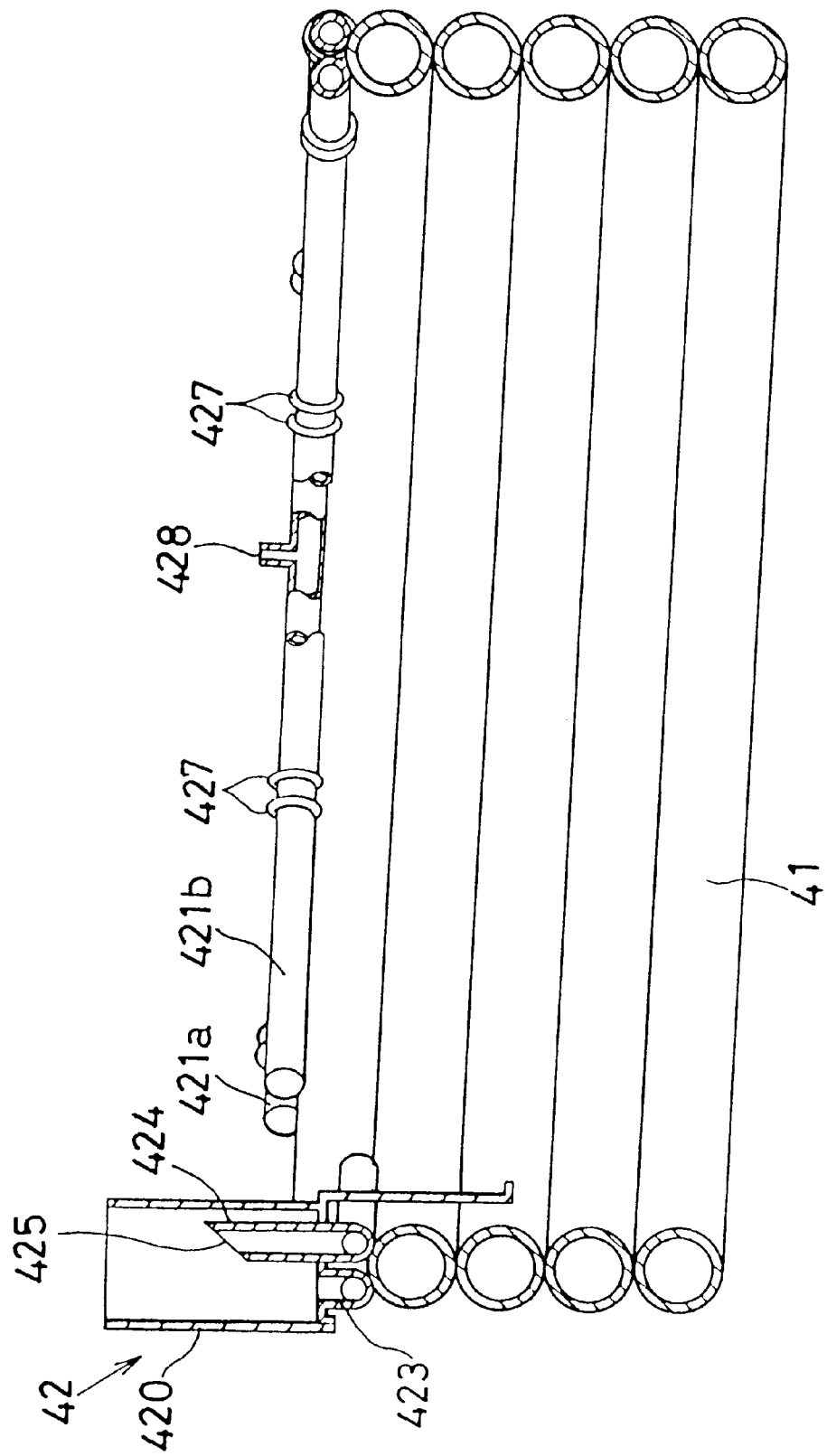
FIG. 10 is a longitudinal cross sectional view of a modified form of the refrigerant liquid spray tool in the evaporator.

It is to be noted that instead of preparing the discrete open-ended pipe 428, the open-ended pipe may be vertically extend integrally from the upper surface or the refrigerant liquid dispersing pipe 421a as shown in FIG. 10.

The height of the open-ended pipe 428 is greater than the one positioned highest among the outlet holes 426, so as not to overflow the refrigerant liquid via the open-ended pipe 428 upon implementing the air-cooling operation.

With the open-ended pipe 428 provided on the refrigerant liquid dispersing pipe 421, it is possible to mitigate the refrigerant liquid from inadvertently flowing out of the refrigerant liquid dispersing pipe 421 especially under the circumstances that the refrigerant liquid is likely to evaporate in the refrigerant liquid dispersing pipe 421 at the very time of starting the air cooling operation. This ensures a good cooling capability for the evaporator 4 so as to positively cool the low temperature water circulating the evaporation coil 41, thus maintaining a required cooling capability upon rising up the air cooling operation.

Figure 11:
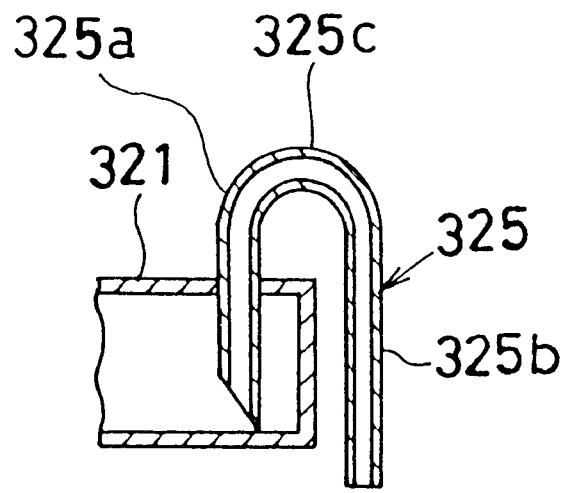
FIG. 11 is an enlarged longitudinal cross sectional view of an absorption liquid dispersing pipe of the high concentration absorption liquid spray tool in the absorption means according to a third embodiment of the invention.

FIG. 11 shows a third embodiment of the invention. In the high concentration absorption liquid spray tool 32 of the absorption device 3, a syphon pipe 325 is provided in the proximity of an upper surface of the distal ends of the absorption liquid dispersing pipe 321.

Figure 11A:
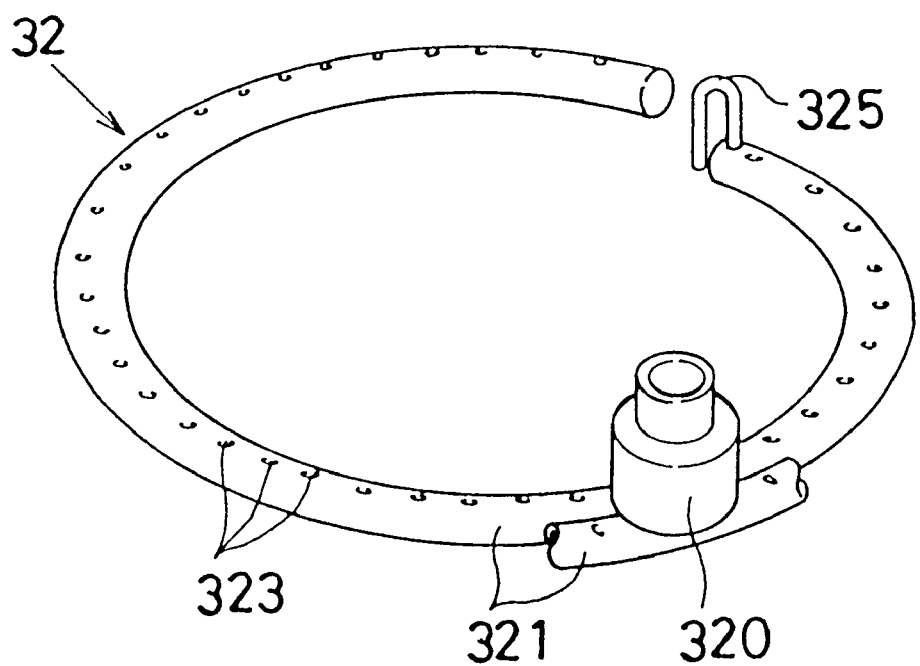
FIG. 11a is a perspective view of the high concentration absorption liquid spray tool in the absorption means.

As shown in FIG. 11a, the syphon pipe 325 is in the form of an inverted J-shape configuration. The syphon pipe 325 has a short pipe 325a and a long pipe 325b. The short pipe 325a has a slantwise open end which pierces an upper surface of the distal lower end of the absorption liquid dispersing pipe 321 to penetrate thereinto. A lower end of the long pipe 325b positions lower than a lower surface of the absorption liquid dispersing pipe 321 to drip out the absorption liquid therein by means of the syphon action. Once the liquid level in the absorption liquid reservoir 320 reaches a curved portion 325c of the syphon pipe 325 which is the highest portion thereof, the syphon action is continuously implemented.

This exhausts the absorption liquid resided in the absorption liquid storage reservoir 320 and the absorption liquid dispersing pipe 321 at the time of suspending the absorption cycle. This prevents the outlet holes 323 from clogging due to the absorption liquid residue being crystallized.

It is to be noted that the groove-forming plate ring may be provided on the absorption liquid dispersing pipe 321.

Figure 12:
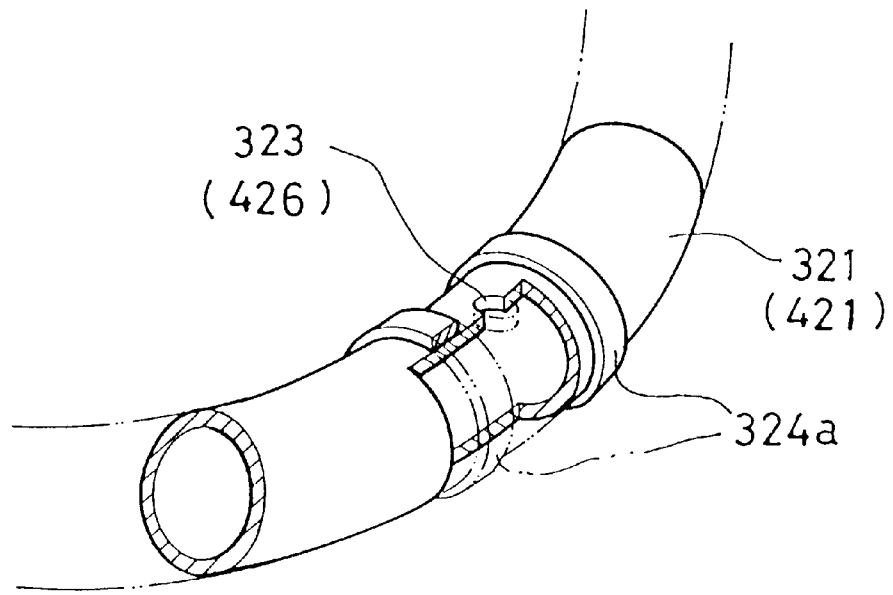
FIG. 12 is a partly perspective view of a high concentration absorption liquid spray tool in the absorption means or a refrigerant liquid spray tool in the evaporator according to a fourth embodiment of the invention.

FIG. 12 shows a fourth embodiment of the invention. In the absorption liquid dispersing pipe 321 and the refrigerant liquid dispersing pipe 421, a groove-forming plate ring 324a is used in the form of stainless steel plate ribbon member instead of the line member 324 (427). In order to positively determine the interval between the plate ribbon members with the outlet hole 323 (426) interposed therebetween, the plate ribbon members are each made of one sheet of metal plate, a middle area of which is blanked to form a blanked section. Both lateral sides of the metal plate join at the lower portion of the absorption liquid dispersing pipe 321 with the blanked section corresponded to the outlet hole 323 (426).

Upon flowing the absorption liquid or refrigerant liquid out of the outlet holes 323 (426), the liquid is regulated its orientation within the groove-forming plate ring 324a while dripping over the absorption coil 31. For this reason, it is possible to attain the same advantages obtained by the previous embodiments of the invention.

Figure 13:
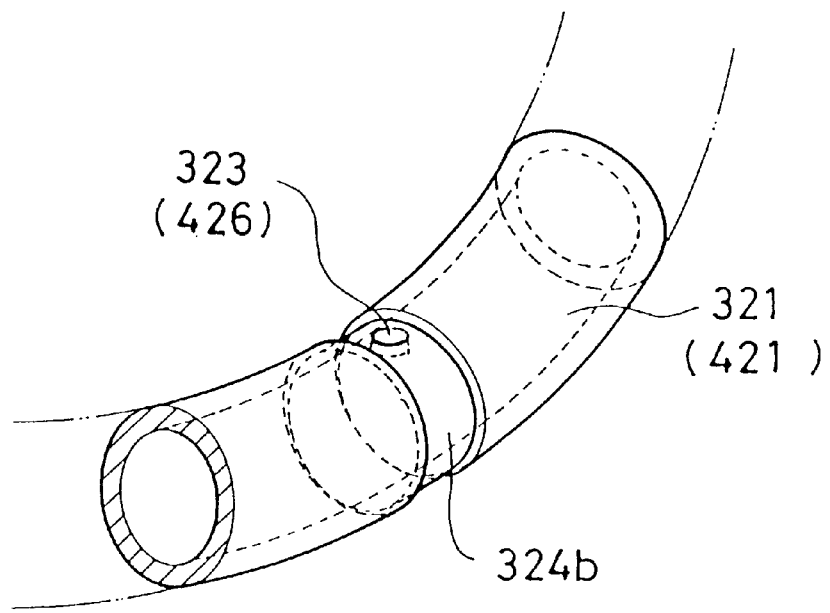
FIG. 13 is a partly perspective view of a high concentration absorption liquid spray tool in the absorption means or a refrigerant liquid spray tool in the evaporator according to a fifth embodiment of the invention.

FIG. 13 shows a fifth embodiment of the invention. Around the absorption liquid dispersing pipe 321 and the refrigerant liquid dispersing pipe 421, a groove 324b is provided by circumferentially cutting an outer surface of the pipes (close-ended pipes) 321, 421 including the area in which the outlet hole 323 (426) resides. The groove 324b serves as a groove-forming ring, and categorically belongs in the line member 324 (427) and the plate ribbon member 324a.

With the presence of the groove 324b, it is possible to regulate the liquid its orientation within the groove 324b.

Alternatively, a wick-like string may be fasten to the absorption liquid dispersing pipe 321 and the refrigerant liquid dispersing pipe 421 respectively. Otherwise, a helical coil may be fit around the outer surface of the absorption liquid dispersing pipe 321 end the refrigerant liquid dispersing pipe 421 respectively.

It is to be appreciated that one of the two refrigerant liquid dispersing pipes 421a, 421b may be omitted in the refrigerant liquid spray tool 42 of the evaporator 4.

It is to be noted that instead of the self-cooling type cooling tower CT provided in the cooling water path 34, a close loop type cooling water device may be used in which the cooling water path 34 is not exposed to the atmospheric environment.

It is further to be noted that the evaporation pipe and absorption pipe may be in the form of serpentine in which a single long pipe meanders in the up-and-down direction.

It is furthermore to be noted that in addition to the air conditioning heat exchanger 44, an air warming heat exchanger apparatus may be provided to warm the air once cooled by the air conditioning heat exchanger 44 in an aim to reducing humidity without dropping a room temperature.

It is to be observed that the dripping device may be used not only to the absorption type refrigerator but also to a general refrigerator and freezer in wide application.

It is possible to apply not merely the double harness type regenerator in which the low and high temperature regenerators 1, 2 are used but also a single harness regenerator may be used in which only one single regenerator is used. In lieu of the gas-fired burner, an oil-fired burner or an electrical heater may be used.

INDUSTRIAL APPLICABILITY

In the present invention, it is possible to drip the refrigerant liquid evenly over the evaporation pipe and the absorption pipe respectively. This prevents the refrigerant liquid from differently spreading or wetting against the pipes depending on each refrigerator produced in the manufacturing process, thus significantly reducing the variations on the refrigerating capability.

What is claimed is:

1. A dripping apparatus for an absorption type refrigerator comprising:

a regenerator means provided to separate a refrigerant vapor from an absorption liquid including a refrigerant by heating the absorption liquid;

a condenser provided to cool the refrigerant vapor so as to condense the refrigerant vapor which is separated from the regenerator means;

an evaporator provided to evaporate a condensed refrigerant liquid under a lower pressure;

an absorption means provided so that the refrigerant vapor evaporated by the evaporator is absorbed by the absorption liquid supplied by the regenerator means;

a pumping means provided to return the absorption liquid from the absorption means to the regenerator means so as to form an absorption cycle with the regenerator, the condenser, the evaporator and the absorption means;

a dripping device provided to drip the refrigerant liquid toward an evaporation pipe in the evaporator, or dripping the absorption liquid toward an absorption pipe in the absorption means;

the dripping device comprising:

a liquid storage means provided to store the liquid to be dripped;

a close-ended pipe positioned under the liquid storage means and placed above the evaporation pipe or the absorption pipe, so as to communicate with a lower end of the liquid storage means; and a liquid dispersing pipe having a plurality of holes located along the close-ended pipe so as to inject the liquid therethrough supplied from the liquid storage means.

2. A dripping apparatus for an absorption type refrigerator as recited in claim 1, wherein the plurality of holes are perforated through an upper surface of the liquid dispersing pipe to inject the dripped liquid upward.

3. A dripping apparatus for an absorption type refrigerator as recited in claim 1 or 2, wherein the liquid dispersing pipe has a circumferential outer surface section in which a plurality of groove-like sections are provided.

4. A dripping apparatus for an absorption type refrigerator as recited in claim 3, wherein the plurality of groove-like sections are formed by winding a line member or plate ribbon member around the liquid dispersing pipe in the manner to stride the plurality of holes alternately.

5. A dripping apparatus for an absorption type refrigerator as recited in claim 3, wherein the plurality of groove-like sections are formed by cutting the circumferential outer surface section of the liquid dispersing pipe in which each of the plurality of holes is provided.

6. A dripping apparatus for an absorption type refrigerator as recited in any of claims 1–2, wherein the liquid dispersing pipe has a plurality of close-ended pipes which are arranged to overlap each other, each of liquid inlet openings provided with the liquid storage means toward the plurality of close-ended pipes, opening at a different liquid level.

7. A dripping apparatus for an absorption type refrigerator as recited in claim 6, wherein an open-ended pipe extended upward to open at an upper surface of the liquid dispersing pipe is connected to the liquid inlet opening opened at a lower liquid level in the liquid dispersing pipe within the liquid storage means of the evaporation pipe.

8. A dripping apparatus for an absorption type refrigerator as recited in any of claim 1–2, wherein a syphon pipe is provided in the liquid dispersing pipe of the absorption pipe, one open end of the syphon pipe has one open end extending into the liquid dispersing pipe, and having the other open end exposing outside the liquid dispersing pipe at a level lower than a lower end of the liquid dispersing pipe.

9. A dripping apparatus for an absorption type refrigerator as recited in any of claim 1–2, wherein the liquid dispersing pipe is shaped in the convoluted form of a single turn, one end of which is higher in level than the other end, and the liquid dispersing pipe being placed under the liquid storage means but situated above an evaporation coil and an absorption coil to be communicated with the lower end of the liquid storage means, and the plurality of holes provided with the liquid dispersing pipe are diametrically increased progressively as oriented upward while diametrically reduced successively as directed downward.

10. A dripping apparatus for an absorption type refrigerator as recited in any of claims 1–2, wherein the plurality of holes provided with the liquid dispersing pipe progressively increase diametrically as a distance gains between a specified hole of the plurality or holes and a communicated section of the liquid dispersing pipe and the liquid storage means.

11. A dripping apparatus for an absorption type refrigerator as recited in claim 3, wherein the liquid dispersing pipe has a plurality of close-ended pipes which are arranged to overlap each other, each of liquid inlet openings provided with the liquid storage means toward the plurality of close-ended pipes opening at a different liquid level.

12. A dripping apparatus for an absorption type refrigerator as recited in claim 4, wherein the liquid dispersing pipe has a plurality of close-ended pipes which are arranged to overlap each other, each of liquid inlet openings provided with the liquid storage means toward the plurality of close-ended pipes opening at a different liquid level.

13. A dripping apparatus for an absorption type refrigerator as recited in claim 5, wherein the liquid dispersing pipe has a plurality of close-ended pipes which are arranged to overlap each other, each of liquid inlet openings provided with the liquid storage means toward the plurality of close-ended pipes opening at a different liquid level.

* * * * *